United States Patent
Masuda

(10) Patent No.: US 8,280,570 B2
(45) Date of Patent: Oct. 2, 2012

(54) POWER CONTROLLER FOR HYBRID VEHICLE

(75) Inventor: Eiji Masuda, Toyota (JP)

(73) Assignee: Denso Corporation, Kariya (JP)

( * ) Notice: Subject to any disclaimer, the term of this patent is extended or adjusted under 35 U.S.C. 154(b) by 1068 days.

(21) Appl. No.: 12/183,372

(22) Filed: Jul. 31, 2008

(65) Prior Publication Data

US 2009/0063007 A1 Mar. 5, 2009

(30) Foreign Application Priority Data

Aug. 31, 2007 (JP) ................................. 2007-225136

(51) Int. Cl.
*B60W 10/06* (2006.01)
*B60W 10/08* (2006.01)

(52) U.S. Cl. ..... 701/22; 701/102; 903/902; 180/65.265; 180/65.235; 318/139

(58) Field of Classification Search .................. 701/102, 701/22; 903/902; 180/65.265, 65.235; 318/139
See application file for complete search history.

(56) References Cited

U.S. PATENT DOCUMENTS

| | | | | |
|---|---|---|---|---|
| 5,251,588 | A * | 10/1993 | Tsujii et al. | 123/142.5 R |
| 5,566,774 | A * | 10/1996 | Yoshida | 180/65.245 |
| 6,018,694 | A | 1/2000 | Egami et al. | |
| 6,253,127 | B1 * | 6/2001 | Itoyama et al. | 701/22 |
| 6,318,486 | B2 * | 11/2001 | Masaki | 180/65.23 |
| 6,583,592 | B2 * | 6/2003 | Omata et al. | 318/139 |
| 6,629,512 | B2 * | 10/2003 | Iwatani et al. | 123/41.14 |
| 6,755,266 | B2 * | 6/2004 | Lasson | 180/65.235 |
| 6,812,586 | B2 * | 11/2004 | Wacknov et al. | 290/52 |
| 6,864,663 | B2 * | 3/2005 | Komiyama et al. | 320/104 |
| 6,883,626 | B2 * | 4/2005 | Aoki et al. | 180/65.235 |
| 6,945,347 | B2 * | 9/2005 | Matsuno | 180/242 |
| 7,148,649 | B2 * | 12/2006 | Ganev | 318/701 |
| 7,178,617 | B2 * | 2/2007 | Morisawa et al. | 180/65.265 |

(Continued)

FOREIGN PATENT DOCUMENTS

JP 2000-179371 6/2000

(Continued)

OTHER PUBLICATIONS

Japanese Office Action dated Nov. 16, 2009, issued in corresponding Japanese Application No. 2007-225136, with English translation.

*Primary Examiner* — Thomas Black
*Assistant Examiner* — Wae Louie
(74) *Attorney, Agent, or Firm* — Nixon & Vanderhye P.C.

(57) ABSTRACT

An operation point of the engine where the fuel economy is optimal is obtained based on an iso-fuel-economy curve which is defined by engine speed and engine torque. Each of the operation points is connected to each other to form an efficiency characteristic line on which the demand operation point is computed. When the operation point of the engine is moved in a direction in which the fuel economy is improved, the moving speed of the operation point is increased so that the operation point rapidly moves to the point of high fuel economy as soon as possible. Contrary, when the operation point moves in a direction where the fuel economy is deteriorated, the moving speed of the operation point of the engine is decreased so that the operation point can be moved toward the point of low fuel economy as slow as possible.

2 Claims, 6 Drawing Sheets

U.S. PATENT DOCUMENTS

| | | | |
|---|---|---|---|
| 7,249,589 B1 * | 7/2007 | Tomatsuri et al. | 123/357 |
| 7,253,353 B2 * | 8/2007 | Stabler | 136/205 |
| 7,253,573 B2 * | 8/2007 | Iwazawa | 318/139 |
| 7,349,797 B2 * | 3/2008 | Donnelly et al. | 701/115 |
| 7,434,641 B2 * | 10/2008 | Takami et al. | 180/65.25 |
| 7,441,617 B2 * | 10/2008 | Nogi et al. | 180/65.235 |
| 7,475,747 B2 * | 1/2009 | Plishner | 180/65.31 |
| 7,631,710 B2 * | 12/2009 | Utsumi | 180/65.21 |
| 7,680,575 B2 * | 3/2010 | Han et al. | 701/51 |
| 7,954,579 B2 * | 6/2011 | Rodriguez et al. | 180/65.265 |
| 7,971,668 B2 * | 7/2011 | Ando et al. | 180/65.265 |
| 2002/0023789 A1 * | 2/2002 | Morisawa et al. | 180/65.2 |
| 2008/0300768 A1 * | 12/2008 | Hijikata | 701/102 |
| 2009/0063007 A1 * | 3/2009 | Masuda | 701/102 |
| 2010/0241297 A1 * | 9/2010 | Aoki et al. | 701/22 |

FOREIGN PATENT DOCUMENTS

| | | |
|---|---|---|
| JP | 2001-238305 | 8/2001 |
| JP | 2006-170059 | 6/2006 |
| JP | 2006-193137 | 7/2006 |
| JP | 2007-076645 | 3/2007 |

* cited by examiner

| REGION | MOVEMENT OF OPERATION POINT | ΔNetag, ΔTetag |
|---|---|---|
| A |  | RAPIDLY INCREASE |
| B |  | SLOWLY INCREASE |
| C |  | RAPIDLY DECREASE |
| D |  | SLOWLY DECREASE |

_(1)_

POWER CONTROLLER FOR HYBRID VEHICLE

CROSS-REFERENCE TO RELATED APPLICATION

This application is based on Japanese Patent Application No. 2007-225136 filed on Aug. 31, 2007, the disclosure of which is incorporated herein by reference.

FIELD OF THE INVENTION

The present invention relates to a power controller for a hybrid vehicle having an engine and an electric motor as power source.

BACKGROUND OF THE INVENTION

In a hybrid vehicle shown in JP-2000-179371A, an engine driving condition in which a fuel economy is optimal every demand power of the engine is established by an efficiency characteristic line which is defined by an engine speed and torque as parameters. On the efficiency characteristic line, an operation point (engine speed and engine torque) at which the demand power can be outputted is determined as a demand operation point. The engine is operated at the demand operation point.

The demand power of the engine is varied according to a demand vehicle driving force, a demand charging amount of a battery and the like. The operation point moves along an efficiency characteristic line according to the variation in demand power of the engine. Even if the operation point moves to deteriorate the fuel economy, the moving speed of the operation point is the same as the case where the operation point moves to improve the fuel economy, Hence, the fuel economy is deteriorated.

SUMMARY OF THE INVENTION

The present invention is made in view of the above matters, and it is an object of the present invention to provide a power controller for a hybrid vehicle which can improve the fuel economy more than a conventional hybrid vehicle.

According to the present invention, a power controller for a hybrid vehicle includes a demand power computing means for computing a demand power of the engine; a demand operation point computing means for computing a demand operation point of the engine based on the demand power of the engine and an efficiency characteristic of the engine; and a control means for controlling an operation point of the engine according to the demand operation point. When the control means moves the operation point of the engine according to the demand operation point, a moving speed of the operation point is changed between a case where the operation point moves to improve a fuel economy and a case where the operation point moves to deteriorate the fuel economy.

With this configuration, when the operation point of the engine is moved in a direction in which the fuel economy is improved, the moving speed of the operation point is increased so that the operation point rapidly moves to the point of high fuel economy as soon as possible. Hence, the fuel economy is improved. Contrary, when the operation point moves in a direction where the fuel economy is deteriorated, the moving speed of the operation point of the engine is decreased so that the operation point can be moved toward the point of low fuel economy as slow as possible. The deterioration of fuel economy is lessened using the high fuel economy range as for a long time as possible.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter.

Figure 1:
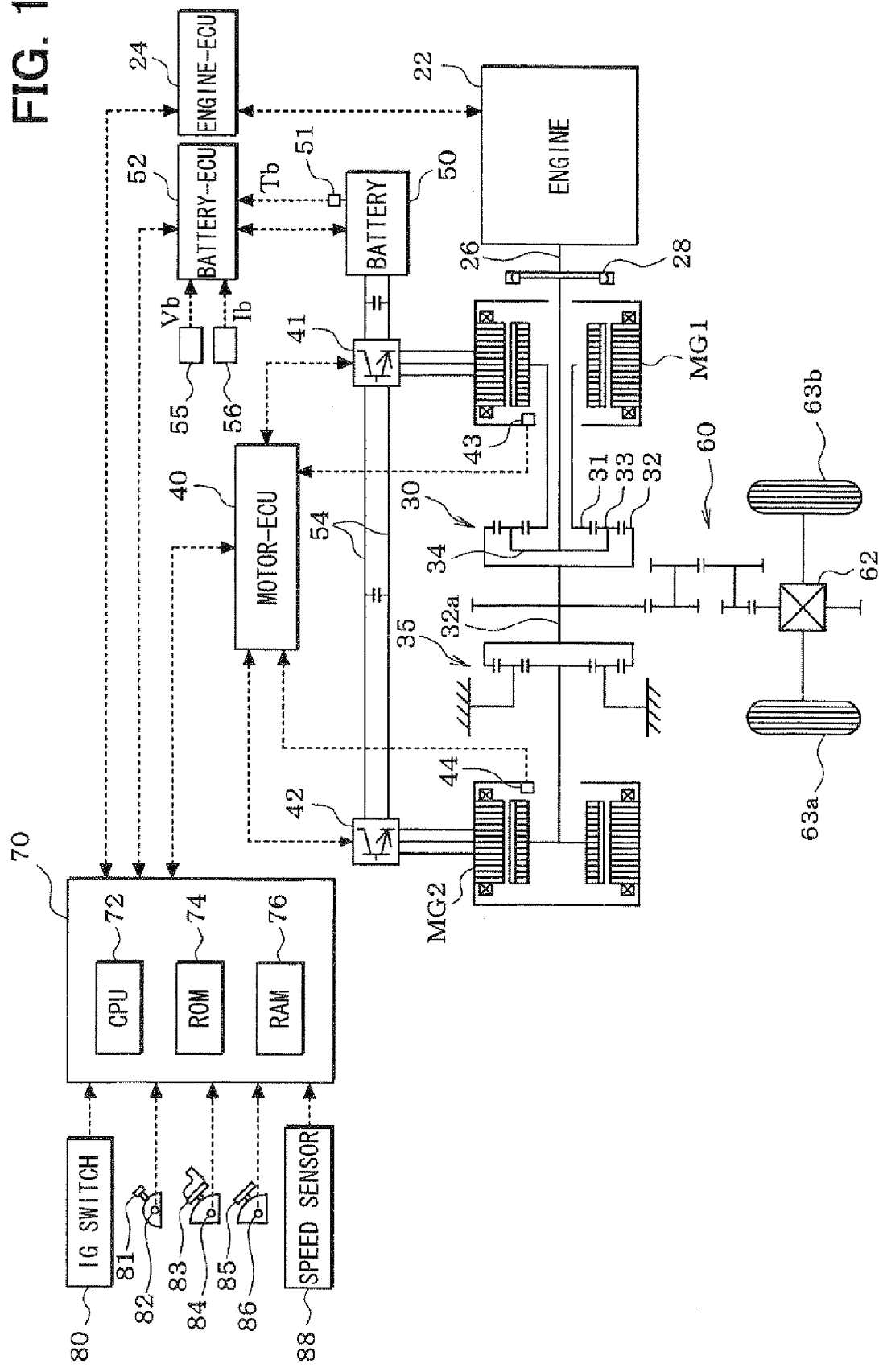
FIG. 1 is a schematic view showing a system structure of a hybrid vehicle according to an embodiment of the present invention.

First, an entire system configuration of a hybrid vehicle is explained based on FIG. 1. A hybrid vehicle is provided with an engine 22, a triaxial power distributing mechanism 30 which is connected to a crankshaft 26 through a dumper 28, a first motor MG1 which is connected to the power distributing mechanism 30, a reduction gear 35 which is connected to a ring gear shaft 32*a*, and a second motor MG2. The first motor MG1 and the second motor MG2 can function as generators. A hybrid-ECU 70 controls a hybrid driving system. The ECU represents an electronic control unit, which is mainly comprised of a microcomputer.

The engine 22 is a gasoline engine. An engine-ECU 24 receives output signals from a crank angle sensor, a coolant temperature sensor and the like in order to perform a fuel injection control, ignition control, and throttle control. The engine-ECU 24 is electrically connected to the hybrid-ECU 70 through a communication line. The engine-ECU 24 receives a control signal from the hybrid-ECU 70 to control the engine 22. The engine-ECU 24 sends a signal representing a driving condition of the engine 22 to the hybrid-ECU 70.

The power distributing mechanism 30 is comprised of a sun gear 31, a ring gear 32 which is coaxially arranged with respect to the sun gear 31, a plurality of pinion gears which are engaged with the ring gear 32 and the sun gear 31, and a carrier 34 which supports the pinions gears rotatably. A planetary gear mechanism is configured by the sun gear 31, the ring gear 32 and the carrier 34.

The carrier 34 is connected to the crankshaft 26 of the engine 22, the sun gear 31 is connected to the first motor MG1, the ring gear 32 is connected to the reduction gear 35 through a ring gear shaft 32*a*. When the first motor MG1 functions as a generator, the driving power of the engine 22 which the carrier 34 receives is distributed to the sun gear 31 and the ring gear 32 according to the gear ratio thereof. When the first motor MG1 functions as an electric motor, the driving power of the engine 22 and the driving power of the first motor MG1 are integrated to be outputted to the ring gear 32. The driving power outputted to the ring gear 32 is transmitted to drive wheels 63a, 63b through the ring gear shaft 32a, a gear mechanism 60 and a differential gear 62.

The first motor MG1 and the second motor MG2 are synchronous motor-generators, which give and receive electric power from a battery 50 through inverters 41, 42. Power lines 54 connecting each of the inverters 41, 42 and the battery 50 are a positive bus line and a negative bus line. Electric power generated by one of the motors MG1 and MG2 is supplied to the other. Hence, the battery 50 is charged or discharged according to electric power generated or consumed by any one of the motors MG1 and MG2.

A motor-ECU 40 controlling the motors MG1 and MG2 receives signals necessary to control each of the motors MG1 and MG2. For example output signals of rotational position sensors 43, 44 which detects rotor positions of each motor MG1, MG2, phase current applied to the motors MG1, MG2 are inputted to the motor-ECU 40. The motor-ECU 40 outputs switching control signals to each of the inverters 41, 42. The motor-ECU 40 is electrically connected to the hybrid-ECU 70 through the communication line. The motor-ECU 40 controls each of the motors MG1, MG2 receiving the control signals from the hybrid-ECU 70. When needed, the motor-ECU 40 sends signals indicative of a driving conditions of each motor MG1, MG2 to the hybrid-ECU 70.

The charge and discharge of the battery 50 are managed by the battery-ECU 52. The signals required to manage the charge and discharge of the battery 50 are inputted into the battery-ECU 52. For example, voltage (battery voltage) Vb between the terminals of the battery 50 detected by a voltage sensor 55 installed between the terminals of the battery 50, charging/discharging currents Ib of the battery 50 detected by a current sensor 56 attached to the power lines 54 connected to the output terminal of the battery 50, and battery temperature Tb which is detected with a temperature sensor 51 attached to the battery 50 are inputted into the battery-ECU 52. The signal regarding the condition of the battery 50 is transmitted to the hybrid-ECU 70 if needed. Furthermore, the battery-ECU 52 calculates the charge condition (remaining capacity SOC) of the battery 50 based on an integrated value of the charging/discharging currents Ib detected by the current sensor 56.

The hybrid-ECU 70 is comprised of a microcomputer having CPU 72, ROM 74 which stores various kinds of programs and initial values, and RAM76 which temporarily stores the various data. The following signals are inputted into the hybrid-ECU 70. That is, an ignition signal from the ignition (IG) switch 80, a shift signal from a shift position sensor 82 which detects an operative position of a shift lever 81, an accelerator opening signal from the accelerator opening sensors 84 which detect a stepped amount of the accelerator 83, a brake-pedal position signal from a brake-pedal position sensor 86 which detects a stepped amount of the brake pedal 85, and a vehicle speed signal from a speed sensor 88 are inputted into the hybrid-ECU 70. As mentioned above, the hybrid-ECU 70 is connected to the engine-ECU24, the motor-ECU40, and the battery-ECU 52 through the communication line. The various control signals and the data signals are transmitted and received between the engine-ECU 24, the motor-ECU 40, and the battery-ECU 52.

Figure 2:
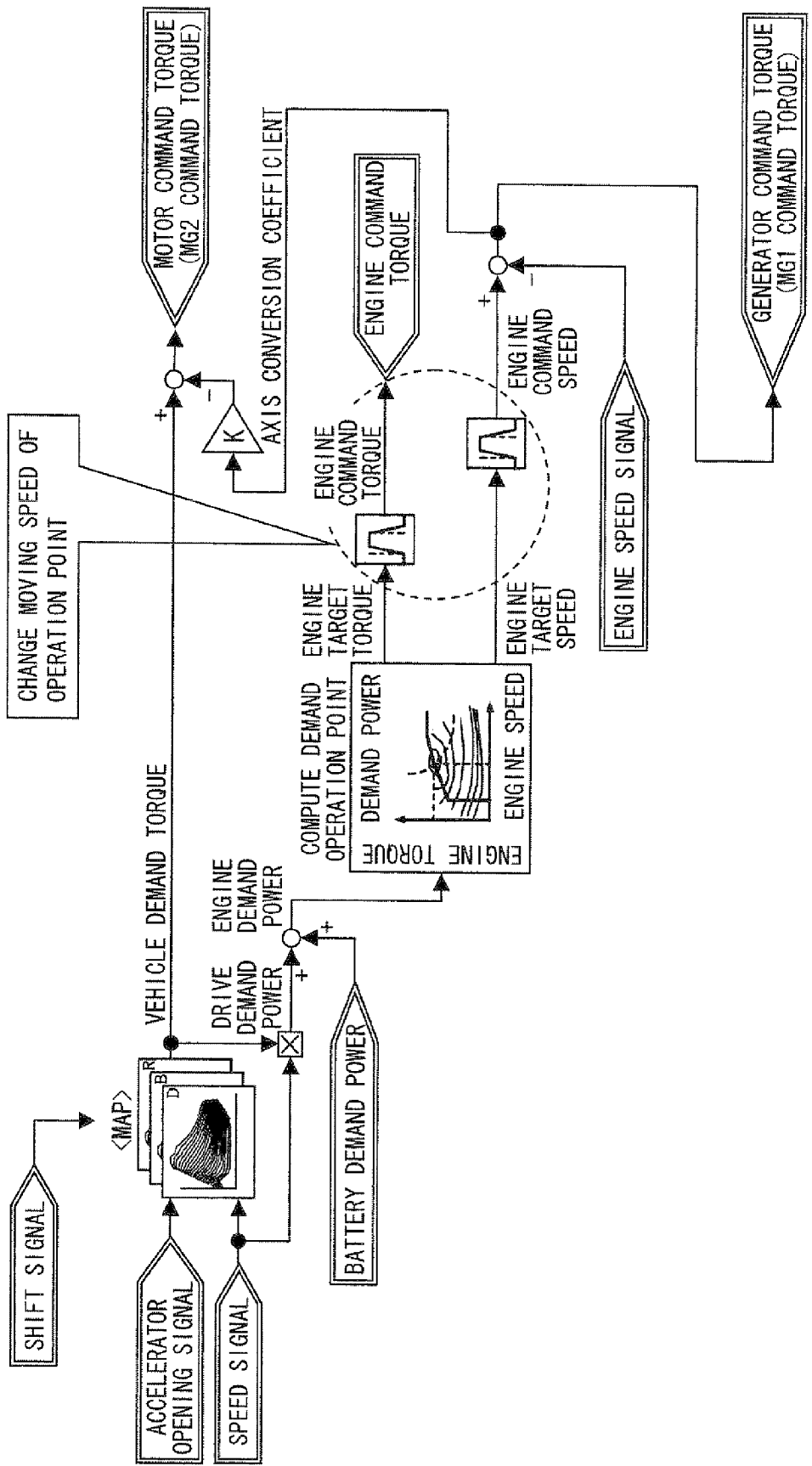
FIG. 2 is a block diagram for explaining a configuration of a drive control system.

As shown in FIG. 2, the hybrid-ECU 70 calculates vehicle demand torque on the driving-force map based on the accelerator opening signal from the accelerator opening sensors 84, the speed signal from the speed sensor 88, the shift signal from the shift position sensor 82, and the like. The hybrid-ECU 70 multiplies the vehicle demand torque and vehicle speed to obtain a drive demand power. A battery demand power for charging/discharging battery 50 is added to the drive demand power in order to obtain a demand power of the engine 22.

Figure 3:
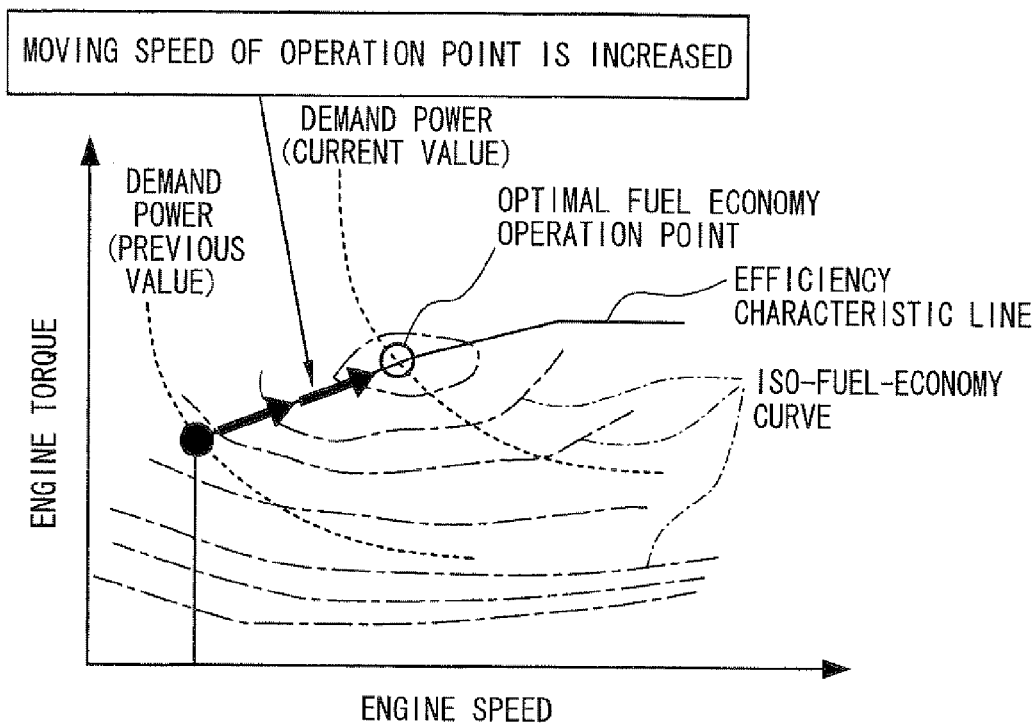
FIG. 3 is a chart for explaining a control in which an engine operating point moves to improve fuel economy.
Figure 4:
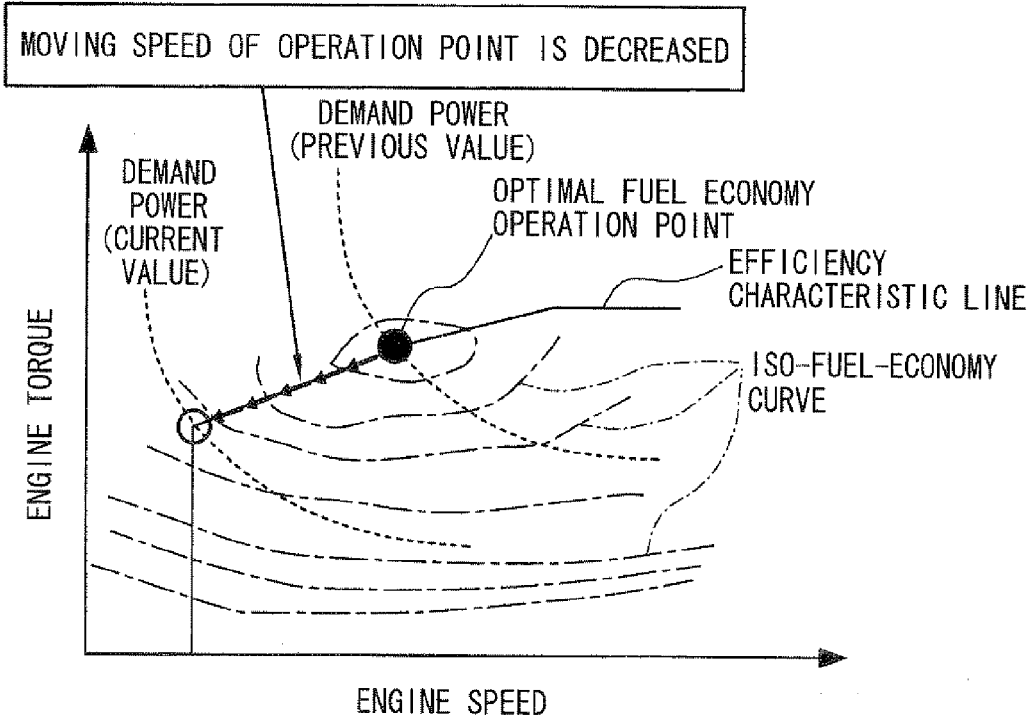
FIG. 4 is a chart for explaining a control in which an engine operating point moves to deteriorate fuel economy.

A demand operation point of the engine 22 (engine target torque and engine target speed) is computed based on the demand power of the engine 22 and efficiency characteristic. The efficiency characteristic of the engine 22 is established on the map in which a relation between the demand power of the engine 22 and an operation point of the engine (engine speed and engine torque) where the fuel economy is optimal is shown. As shown in FIGS. 3 and 4, the operation point of the engine 22 (engine speed and engine torque) where the fuel economy is optimal is obtained with respect to every demand power of the engine 22 based on an iso-fuel-economy curve which is defined by the engine speed and the engine torque as parameters. Each of the operation points is connected to each other to form an efficiency characteristic line on which the demand operation point (engine target torque and engine target speed) are computed so that the demand power can be outputted.

The operation point of the engine 22 is controlled according to the demand operation point. A moving speed of the operation point is varied between a case where a moving direction of the operation point is a direction where fuel economy is improved and a case where a moving direction of the operation point is a direction where fuel economy is deteriorated. Specifically, as shown in FIG. 3, when the operation point moves in a direction where the fuel economy is improved, the moving speed of the operation point of the engine 22 is increased (a moving amount per unit time is increased), so that the operation point can be moved toward the point of high fuel economy as fast as possible. Contrary, as shown in FIG. 4, when the operation point moves in a direction where the fuel economy is deteriorated, the moving speed of the operation point of the engine 22 is decreased (a moving amount per unit time is reduced), so that the operation point can be moved toward the point of low fuel economy as slow as possible. The deterioration of fuel economy is lessened using the high fuel economy range as for a long time as possible.

When the moving speed of the operation point is decreased, moving amount (variation amount) of an engine command torque and an engine command speed per a computing period is reduced. The engine command torque and the engine command speed are established according to the engine target torque and the engine target speed at the demand operation point. The engine command torque and the engine command speed are varied slowly relative to the variation in engine target torque and the engine target speed. When the moving speed of the operation point is increased, the moving amount of the engine command torque and the engine command speed per a computing period is increased. The engine command torque and the engine command speed are varied rapidly relative to the variation in engine target torque and the engine target speed.

The engine-ECU 24 controls an intake air flow rate (throttle opening) and a fuel injection quantity according to the engine command torque to generate engine torque corresponding to the engine command torque.

Based on a speed difference between the engine command speed and an engine speed detected by the speed sensor (not shown), a generator command signal (a command torque to the first motor MG1) is computed. A correction torque which is obtained by multiplying the speed difference and an axis conversion coefficient K is subtracted from the vehicle demand torque to obtain a motor command torque (a command torque to the second motor MG2).

Furthermore, in the present embodiment, the computer determines whether a driver's abrupt acceleration demand exists based on the accelerator opening signal from the accelerator opening sensors 84. When the abrupt acceleration demand is detected, a priority is given to the abrupt acceleration demand over the fuel economy, so that the operation point of the engine 22 is rapidly moved to an operation point at which the abrupt acceleration can be performed.

Figure 5:
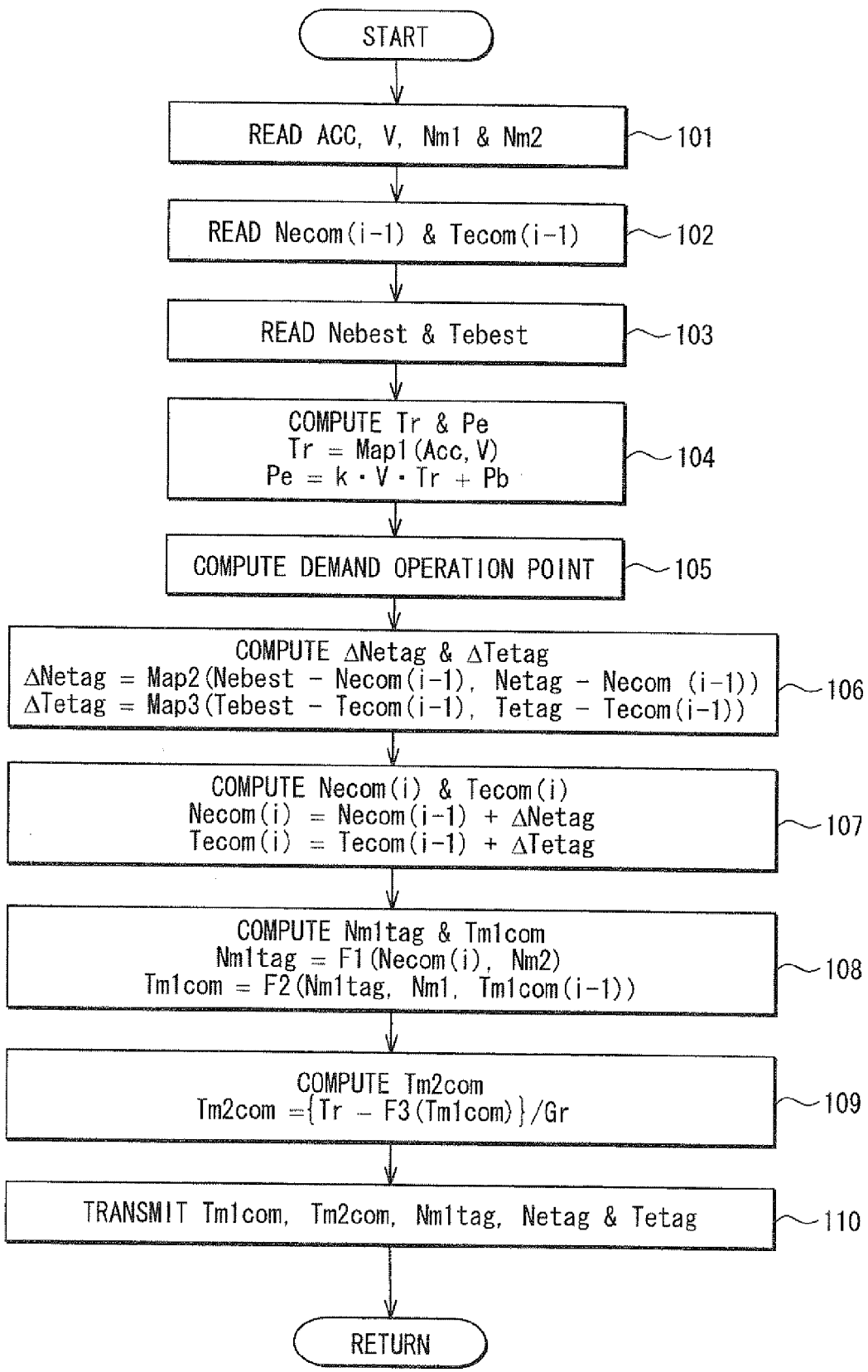
FIG. 5 is a flowchart showing a drive control program.

As described above, the control of the operation point of the engine 22 is performed by executing a drive control program shown in FIG. 5. This program is executed in a specified period while an ignition switch 80 is ON.

In step 101, the computer reads an accelerator opening Acc from the accelerator opening sensor 84, a vehicle speed V from a speed sensor 88, and rotational speeds Nm1, Nm2 of the motors MG1, MG2. The motor-ECU 40 computes the rotational speed Nm1, Nm2 of the motor MG1, MG2 based on intervals of output pulses of rotational position detecting sensors 43, 44. These data are transmitted from the motor-ECU 40 to the hybrid-ECU 70.

Then, the procedure proceeds to step 102 in which the previous engine command speed Necom (i−1) and the previous engine command torque Tecom(i−1) are read. In step 103, the computer reads optimal operation points Nebest, Tebest where the fuel economy is highest from the all operation points (efficiency characteristic lines in FIGS. 3 and 4).

Then, the procedure proceeds to step 104 in which the demand torque Tr which is outputted on the ring gear shaft 32a and the demand torque Pe of the engine 22 are computed based on the accelerator opening Acc and the vehicle speed V. The demand torque Tr according to the present accelerator opening Acc and the vehicle speed V is calculated with reference to a demand torque calculation map Map1(Acc, V). The demand torque calculation map Map1(Acc, V) is obtained by experiment and simulation and is stored in the ROM 74.

$$Tr=Map1(Acc,V)$$

The demand torque Pe is calculated based on the following formula, $$Pe=k \cdot V \cdot Tr+Pb$$

k: conversion coefficient
V: vehicle speed
Tr: demand torque
Pb: battery demand power Then, the procedure proceeds to step 105 in which the demand operation point (engine target speed Netag, engine target torque Tetag) at which the demand power Pe of the engine 22 is outputted is computed. The relation between the demand power Pe, the engine target speed Netag, and the engine target torque Tetag is expressed as follows:

$$Pe=Netag \times Tetag$$

The procedure proceeds to step 106 in which moving amounts ΔNetag, ΔTetag of the operation point per a computing period, which correspond to moving speed of the operation point of the engine 22 are computed. As shown in FIG. 3, when the operation point of the engine 22 is moved in a direction in which the fuel economy is improved, the moving amount ΔNetag, ΔTetag are increased so that the operation point rapidly moves to the point at which fuel economy is high as soon as possible. Hence, the fuel economy is improved. Contrary, as shown in FIG. 4, when the operation point moves in a direction where the fuel economy is deteriorated, a moving amount ΔNetag, ΔTetag is reduced so that the operation point can be moved toward the point of low fuel economy as slow as possible, The deterioration of fuel economy is lessened using the high fuel economy range as for a long time as possible.

Figure 6:
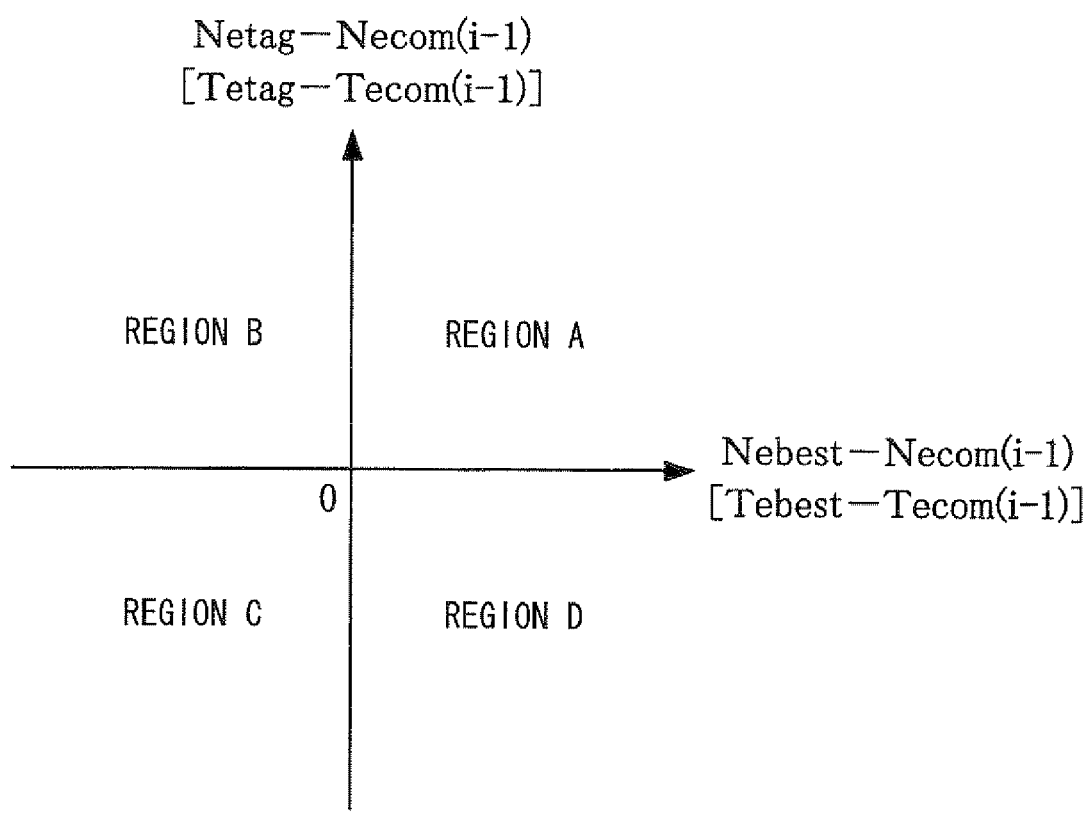
FIG. 6 is a chart for explaining a way of defining four regions A-D.
Figure 7:
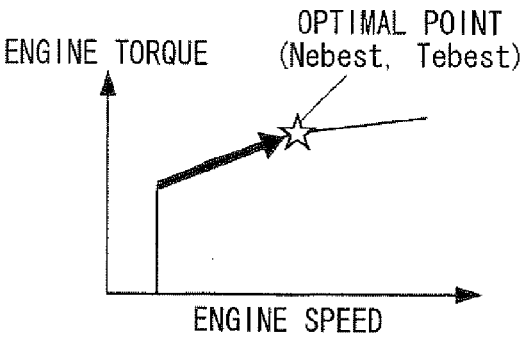
FIG. 7 is a chart for explaining a movement of the operation point in four regions A-D.
Figure 7:
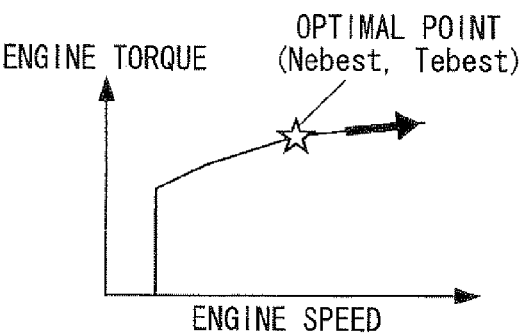
Figure 7:
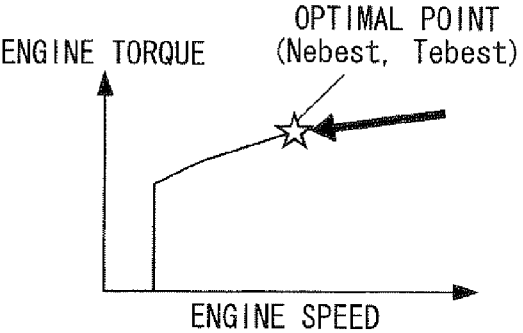
Figure 7:
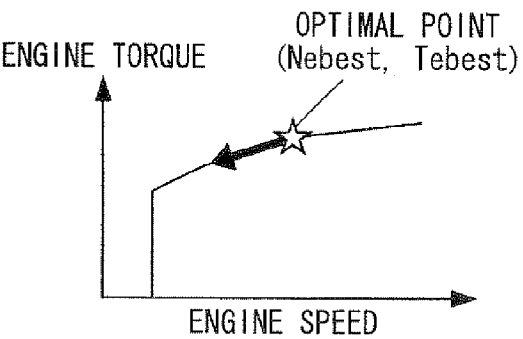

Specifically, as shown in FIG. 6, four regions A-D are defined according to differences [Nebest−Necom(i−1)], [Tebest−Tecom(i−1)] between most optimal fuel economy operation points Nebest, Tebest and the previous command operation points Necom (i−1), Tecom (i−1), and differences [Netag−Necom(i−1)], [Tetag−Tecom(i−1) between the demand operation points Netag, Tetag and the previous command operation points Necom(i−1), Tecom(i−1). As shown in FIG. 7, the moving amounts ΔNetag, ΔTetag of the operation points are established every regions.

[Region A]

Regarding the engine speed, in a region A where "Nebest−Necom(i−1)>0" and "Netag−Necom(i−1)>0", the engine target speed Netag moves a direction in which the engine speed increases and the fuel economy is improved. The moving amount ΔNetag is set as a large positive value, so that the engine command speed Necom(i) is rapidly increased.

Regarding the engine torque, in the region A where "Tebest−Tecom(i−1)>0" and "Tetag−Tecom(i−1)>0", the engine target torque Tetag moves a direction in which the engine torque increases and the fuel economy is improved. The moving amount ΔTetag is set as a large positive value, so that the engine command torque Tecom(i) is rapidly increased.

[Region B]

Regarding the engine speed, in a region B where "Nebest−Necom(i−1)<0" and "Netag−Necom(i−1)>0", the engine target speed Netag moves a direction in which the engine speed increases and the fuel economy is deteriorated. The moving amount ΔNetag is set as a small positive value, so that the engine command speed Necom(i) is slowly increased.

Regarding the engine torque, in the region B where "Tebest−Tecom(i−1)<0" and "Tetag−Tecom(i−1)>0", the engine target torque Tetag moves a direction in which the engine torque increases and the fuel economy is deteriorated. The moving amount ΔTetag is set as a small positive value, so that the engine command torque Tecom(i) is slowly increased.

[Region C]

Regarding the engine speed, in a region C where "Nebest−Necom(i−1)<0" and "Netag−Necom(i−1)<0", the engine target speed Netag moves a direction in which the engine speed decreases and the fuel economy is improved. The moving amount ΔNetag is set as a large negative value of which absolute value is larger than that in the region B, so that the engine command speed Necom(i) is rapidly decreased.

Regarding the engine torque, in the region A where "Tebest−Tecom(i−1)<0" and "Tetag−Tecom(i−1)<0", the engine target torque Tetag moves a direction in which the engine torque decreases and the fuel economy is improved. The moving amount ΔTetag is set as a large negative value, so that the engine command torque Tecom(i) is rapidly decreased.

[Region D]

Regarding the engine speed, in a region D where "Nebest−Necom(i−1)>0" and "Netag−Necom(i−1)<0", the engine target speed Netag moves a direction in which the engine speed decreases and the fuel economy is deteriorated. The moving amount ΔNetag is set as a small negative value, so that the engine command speed Necom(i) is slowly decreased.

Regarding the engine torque, in the region D where "Tebest−Tecom(i−1)>0" and "Tetag−Tecom(i−1)<0", the engine target torque Tetag moves a direction in which the engine torque decreases and the fuel economy is deteriorated.

The moving amount ΔTetag is set as a large negative valuer so that the engine command torque Tecom(i) is rapidly decreased.

In the present embodiment, the computer determines whether a driver's abrupt acceleration demand exists based on the accelerator opening signal from the accelerator opening sensors 84. When the abrupt acceleration demand is detected, the moving amounts ΔNetag, ΔTetag are set as large positive values in the same manner as in the region A. Thereby, a priority is given to the abrupt acceleration demand over the fuel economy so that the operation point of the engine 22 is rapidly moved to an operation point at which the abrupt acceleration can be performed.

Then, the procedure proceeds to step 107 in which the moving amount ΔNetag is added to the previous engine command speed Necom(i−1) to obtain the present engine command speed Necom(i). The moving amount ΔTetag is added to the previous engine command torque Tecom(i−1) to obtain the present engine command torque Tecom(i).

$$Necom(i)=Necom(i-1)+\Delta Netag$$

$$Tecom(i)=Tecom(i-1)+\Delta Tetag$$

Then, the procedure proceeds to step 108 in which the target speed Nm1tag and the command torque Tm1com of the first motor MG1 are computed. The target speed Nm1tag of the first motor MG1 is computed based on a map or formula F1 which uses the engine command speed Necom(i) and the rotational speed Nm2 of the second motor MG2 as parameters. The command torque Tm1com of the first motor MG1 is computed based on a map or a formula F2 which uses the target rotational speed Nm1tag, the actual rotational speed Nm1 and the previous command torque Tm1com(i−1) of the first motor MG1 as parameters.

Then, the procedure proceeds to step 109 in which the command torque Tm2com of the second motor MG2 is computed according to following formula.

$$Tm2com=\{Tr-F3(Tm1com)\}/Gr$$

wherein Tr represents the demand torque, and Gr represents gear ratio of the reduction gear 35. F3(TM1 com) is computed based on a map or formula which uses the command torque Tm1com of the first motor MG1 as a parameter.

Then, the procedure proceeds to step 110 in which the command torque Tm1com, Tm2com of the motors MG1, MG2, the target rotational speed Nm1tag of the first motor MG1, and the target speed Netag and target torque Tetag of the engine 22 are transmitted to the motor-ECU40 or the engine-ECU 24. The engine-ECU 24 controls the intake air system, the fuel injection system, the ignition system in such a manner that the actual speed and actual torque of the engine 22 are consistent with the target speed Netag and the target torque Tetag.

According to the present embodiment, as shown in FIG. 3, when the operation point moves in a direction where the fuel economy is improved, the moving speed of the operation point of the engine 22 is increased (a moving amount per a computing period is increased), so that the operation point can be moved toward the point of high fuel economy as fast as possible. Contrary, as shown in FIG. 4, when the operation point moves in a direction where the fuel economy is deteriorated, the moving speed of the operation point of the engine 22 is decreased (a moving amount per a computing period is reduced), so that the operation point can be moved toward the point of low fuel economy as slow as possible. The deterioration of fuel economy is lessened using the high fuel economy range as for a long time as possible. Thereby, the fuel economy of the hybrid vehicle can be improved.

Furthermore, when the abrupt acceleration demand is detected, a priority is given to the abrupt acceleration demand over the fuel economy, so that the operation point of the engine 22 is rapidly moved to an operation point at which the abrupt acceleration can be performed. The acceleration responsiveness can be improved.

Besides, the present invention is not limited to the hybrid vehicle shown in FIG. 1, but can be applied to the hybrid vehicle of various drive systems which use the engine and the motor together as the source of power of vehicles.

What is claimed is:

1. A power controller for a hybrid vehicle having an engine and an electric motor as power source, the power controller comprising;
   a control means for controlling an operation point of the engine, which is determined based on an engine speed and an engine torque;
   a demand power computing means for computing a demand power of the engine; and
   a demand operation point computing means for computing a demand operation point of the engine based on the demand power of the engine and an efficiency characteristic of the engine; wherein
   when the control means moves the operation point of the engine according to the demand operation point, a moving speed of the operation point in a case where the operation point moves to improve a fuel economy is faster than that in a case where the operation point moves to deteriorate the fuel economy.

2. A power controller for a hybrid vehicle according to claim 1, further comprising an abrupt acceleration demand detecting means for detecting an abrupt acceleration demand of a driver, wherein
   when the abrupt acceleration demand is detected, the control means gives a priority to the abrupt acceleration demand over the fuel economy and changes the moving speed of the operation point according to the abrupt acceleration demand.

* * * * *